G. E. PELLISSIER.
PROPULSION MECHANISM FOR RAIL GRINDERS.
APPLICATION FILED FEB. 7, 1912.
1,032,499.
Patented July 16, 1912.
2 SHEETS—SHEET 1.
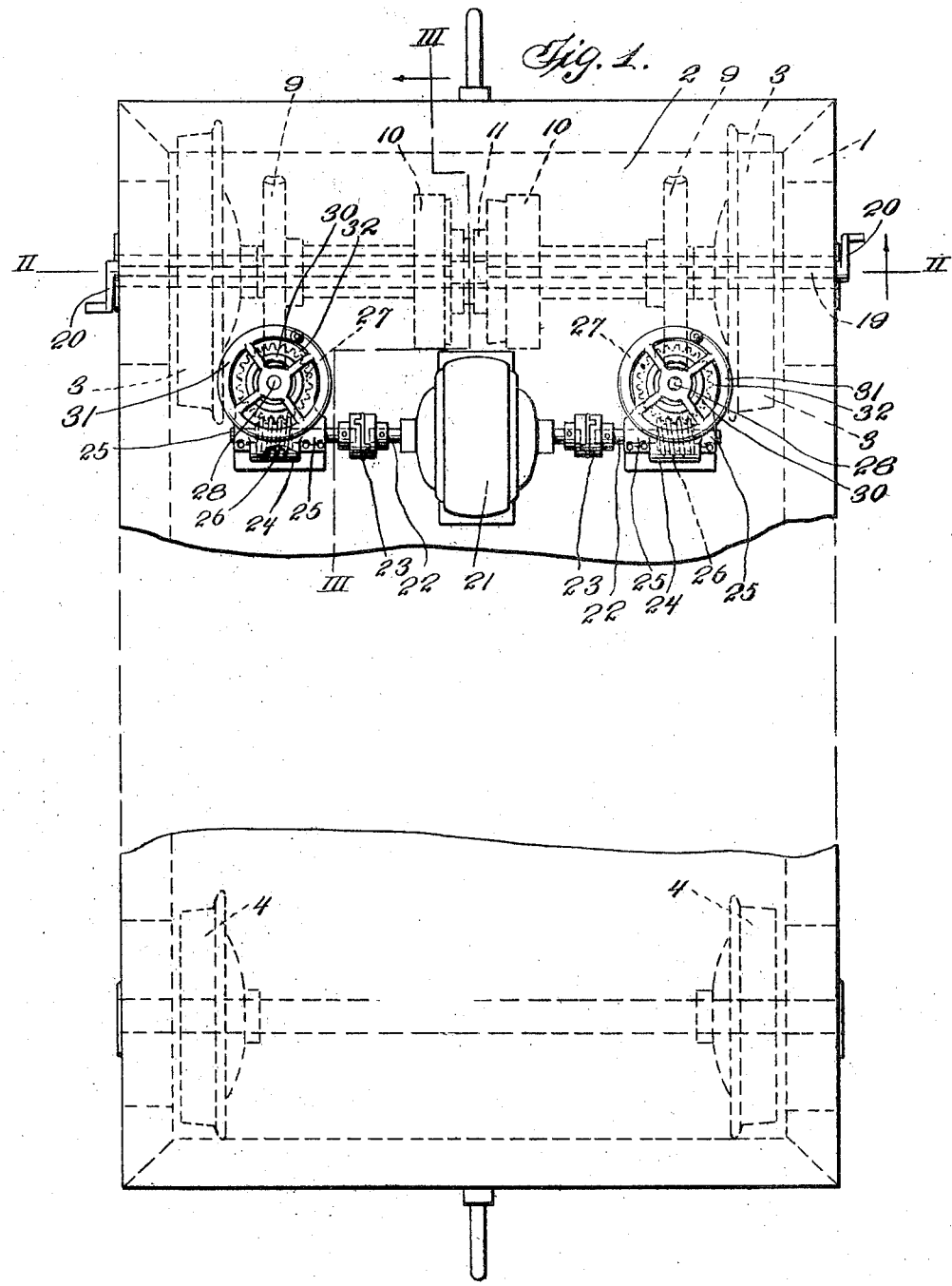

G. E. PELLISSIER.
PROPULSION MECHANISM FOR RAIL GRINDERS.
APPLICATION FILED FEB. 7, 1912.
1,032,499.
Patented July 16, 1912.
2 SHEETS—SHEET 2.
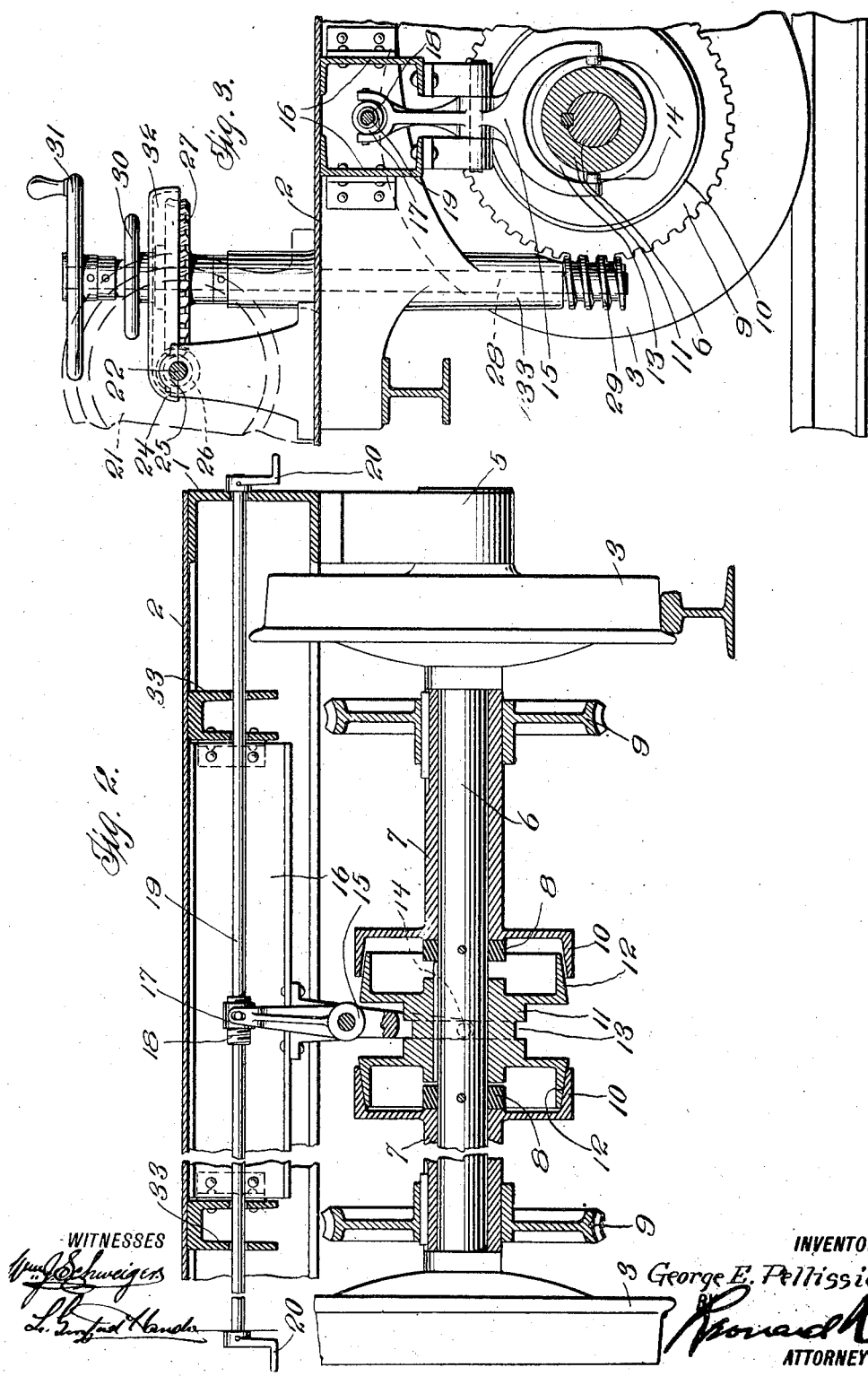
INVENTOR
George E. Pellissier

UNITED STATES PATENT OFFICE.

GEORGE E. PELLISSIER, OF JERSEY CITY, NEW JERSEY, ASSIGNOR TO LOUIS D. PELLISSIER, OF HOLYOKE, MASSACHUSETTS.

PROPULSION MECHANISM FOR RAIL-GRINDERS.

1,032,499.   Specification of Letters Patent.   Patented July 16, 1912.

Application filed February 7, 1912. Serial No. 676,381.

*To all whom it may concern:*

Be it known that I, GEORGE E. PELLISSIER, a citizen of the United States, and a resident of Jersey City, county of Hudson, and State of New Jersey, have invented certain new and useful Improvements in Propulsion Mechanism for Rail-Grinders, set forth in the following specification.

This invention relates to propulsion mechanism for trucks adapted to be operated upon railway tracks and the invention is especially applicable to such a truck as is illustrated in my co-pending application Serial No. 667,115, filed December 21, 1911, for rail grinder.

An object sought to be attained is the provision of a positive and uniform propulsion of the truck, in such a manner as to effect a movement of the truck either forwardly or rearwardly at the will of the operator and with all requisite convenience either through the medium of hand-propulsion or power-propulsion.

The above and further objects of the invention are set forth in the following claims which should be read in connection with this specification which has reference to an illustrative embodiment of the invention, shown in the accompanying drawings, which form a part of this application, and in which,—

Figure 1 is a plan view of a truck provided with the propulsion mechanism forming the subject matter of this application, parts of said truck being broken away to evidence that any desired mechanism may be carried, such for instance, as that illustrated in the co-pending application above referred to; Fig 2 is an enlarged transverse sectional view taken substantially on the plane of line II—II of Fig. 1; and Fig. 3 is a correspondingly enlarged detail sectional view taken at right angles to the view shown in Fig. 2, said section being taken substantially on the plane of line III—III of Fig. 1.

Referring to the parts by numerals,—1 indicates the outer frame and 2 the flooring of the truck platform.

3 indicates the traction wheels and 4 the idler wheels. The traction wheels 3 are supported from the under surface of the platform frame 1 in suitable bearings 5 and are fixed to an axle 6 which is freely rotatable in the bearings 5.

Fitted upon the axle 6, between the wheels 3, are a pair of sleeves 7, said sleeves being placed end to end and being spaced apart leaving a central portion of the axle 6 uncovered thereby. The outer ends of the respective sleeves 7 engage the inner surface portions of the hubs of the wheels 3 and the inner ends of the sleeves engage retaining washers or rings 8 which are fixed rigidly to the axle 6 and said sleeves are thus positively held against longitudinal movement along the axle. The sleeves, however, are free to rotate.

At the outer ends of each of the sleeves 7 is fixed a drive gear 9. At the inner ends each of said sleeves is formed or provided with a clutch member 10, said clutch members being of the friction type and having their faces opposing.

Feathered upon the uncovered portion of the axle 6, intermediate the rings 8, is a shiftable clutch member 11 having opposing conical clutch surfaces 12—12, said surfaces being adapted to engage one or the other of the clutch members 10 according to the direction into which the shiftable clutch member 11 is moved. The shiftable clutch member 11 is formed with an annular guide-groove 13 adapted to be engaged by inwardly projecting pins 14 formed upon the lower end of a yoke arm 15 which is pivotally mounted in the intermediate frame work 16 of the truck-platform. The upper end of the yoke-arm 15 flexibly engages an internally threaded sleeve 17 the threads of which are in turn engaged by the threads of an externally threaded screw 18 which is fixed to a rotatably mounted shaft 19. The shaft 19 extends transversely of the platform and projects slightly beyond the opposite side faces thereof, said projecting portions being fitted with suitable operating handles 20.

Mounted upon the floor 2 of the platform is a motor 21, the power shaft 22 of which is extended transversely of the platform in a plane substantially parallel with the axle 6. The opposite ends of the shaft 22 are extended through flexible couplings 23 into casings 24. Each of the casings 24 comprises a pair of bearings 25 spaced apart and supporting the power shaft. Intermediate the bearings 25 in each casing 24, a worm pinion 26 is fixed to the shaft 22 and said pinions are adapted to engage and rotate worm gears 27 carried upon supplemental power shafts 28, which extend substantially vertically through the platform downwardly into proximity with the gears 9 on the traction wheel axle 6. Worm pinions 29 are fixed to the lower ends of the shafts 28, and the teeth thereof engage the teeth of the drive gears 9. The configuration and assemblement of the several gears and pinions is such that a continuous rotation of the power shaft 22 in one direction will serve to rotate the gears 9 in opposite directions.

Since it may ofttimes be advisable, or necessary to rotate the shafts 28 by hand, instead of the power transmitted from the shaft 22 into the gears 27, it is advisable that the said gears 27 be so mounted upon the shafts 28 as to be caused to impart their rotation to said shafts only after the appropriate manipulation of clutch members 30. At other times said gears are free to rotate without imparting movement to the shafts. Suitable hand-wheels 31 are fixed to the upper ends of the shafts 28 for imparting movement thereto by hand when the respective gears 27 are released.

A convenient safety guard 32 covers each set of gears 26, 27 for the protection of workmen.

From the foregoing it will be apparent that power from the shaft 22, driving the gears 9, and with them the clutch members 10, in opposite directions, may be imparted to the axle 6 for driving said axle in either direction according to the position of the shiftable clutch member 11, and that said clutch member may be readily shifted into tight frictional engagement with either of the clutch members 10 by rotation of the shaft 19 through the medium of the operating handles 20 at opposite sides of the truck platform.

What is claimed and what is desired to be secured by United States Letters Patent is:—

1. In a rail grinder adapted to operate upon either rail, a truck for the grinder mechanism comprising a platform; a traction wheel; a power shaft mounted upon said platform; means operated thereby adapted to rotate said traction wheel in two directions; and means extending upon opposite sides of said platform adapted for selecting the direction of rotation imparted to said traction wheel, said means being adapted to be conveniently operated by operators at either side of said platform.

2. In a propulsion mechanism for trucks, the combination comprising a platform, a traction wheel; an axle fixed to said wheel; a pair of drive gears freely rotatable upon said axle; means for rotating said drive gears in opposite directions; a pair of clutch members one fixed to and rotatable with each of said gears; a shiftable clutch member feathered upon said axle adapted to be shifted for engagement with either of said first mentioned clutch members whereby the movement of such clutch member thus engaged may be transmitted through said shiftable clutch member to said axle for rotating said axle and said traction wheel in the direction of rotation of the drive gear to which the engaged clutch member is fixed; and means extending upon opposite sides of said platform whereby said shiftable clutch member may be conveniently shifted at will by operators at either side of said platform.

3. In a propulsion mechanism for trucks: the combination comprising a platform; a traction wheel; an axle fixed to said wheel; a pair of drive gears freely rotatable upon said axle; a pair of clutch members one fixed to and rotatable with each of said gears; a shiftable clutch member feathered upon said axle adapted to be shifted for engagement with either of said first mentioned clutch members; a power shaft mounted upon said platform; supplemental power shafts driven by said first power shaft and adapted to drive said drive gears in opposite directions; and means extending upon opposite sides of said platform whereby said shiftable clutch members may be conveniently shifted at will by operators at either side of said platform.

4. In a propulsion mechanism for trucks; the combination comprising a platform; a traction wheel; an axle fixed to said wheel; a pair of drive gears freely rotatable upon said axle; a pair of clutch members one fixed to and rotatable with each of said gears; a shiftable clutch member feathered upon said axle adapted to be shifted for engagement with either of said first mentioned clutch members; a power shaft mounted upon said platform having worm pinions fixed thereto; supplemental power shafts carrying worm gears engaging said worm pinions; clutch mechanisms for fixing said worm gears to said supplemental power shafts; said supplemental power shafts being adapted to drive said drive gears in opposite directions; and means extending upon opposite sides of said platform whereby said shiftable clutch member may be conveniently shifted at will by operators at either side of said platform.

In witness whereof, I have signed my name to this specification, in the presence of two subscribing witnesses.

GEORGE E. PELLISSIER.

Witnesses:
ISIDOR NINER,
LEONARD DAY.